United States Patent
Fukushima

(10) Patent No.: US 9,327,352 B2
(45) Date of Patent: May 3, 2016

(54) CUBIC BORON NITRIDE SINTERED BODY

(71) Applicant: TUNGALOY CORPORATION, Iwaki-shi, Fukushima (JP)

(72) Inventor: Yuichiro Fukushima, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 36 days.

(21) Appl. No.: 14/356,812

(22) PCT Filed: Nov. 7, 2012

(86) PCT No.: PCT/JP2012/078774
§ 371 (c)(1),
(2) Date: May 7, 2014

(87) PCT Pub. No.: WO2013/069657
PCT Pub. Date: May 16, 2013

(65) Prior Publication Data
US 2014/0315015 A1    Oct. 23, 2014

(30) Foreign Application Priority Data

Nov. 7, 2011 (JP) ................................. 2011-243261

(51) Int. Cl.
   B23B 27/14      (2006.01)
   C04B 35/5831    (2006.01)
   C04B 35/645     (2006.01)
   C04B 41/87      (2006.01)
   C04B 41/00      (2006.01)
   C04B 41/50      (2006.01)
   C04B 35/63      (2006.01)
   C04B 35/638     (2006.01)
   C22C 26/00      (2006.01)
   B22F 5/00       (2006.01)

(52) U.S. Cl.
   CPC ........... *B23B 27/148* (2013.01); *C04B 35/5831* (2013.01); *C04B 35/6303* (2013.01); *C04B 35/638* (2013.01); *C04B 35/645* (2013.01); *C04B 41/009* (2013.01); *C04B 41/5068* (2013.01); *C04B 41/87* (2013.01); *B22F 2005/001* (2013.01); *C04B 2235/3217* (2013.01); *C04B 2235/386* (2013.01); *C04B 2235/3817* (2013.01); *C04B 2235/3839* (2013.01); *C04B 2235/3847* (2013.01); *C04B 2235/3852* (2013.01); *C04B 2235/3856* (2013.01); *C04B 2235/3865* (2013.01); *C04B 2235/3886* (2013.01); *C04B 2235/402* (2013.01); *C04B 2235/404* (2013.01); *C04B 2235/405* (2013.01); *C04B 2235/5292* (2013.01); *C04B 2235/5436* (2013.01); *C04B 2235/5445* (2013.01); *C04B 2235/72* (2013.01); *C04B 2235/725* (2013.01); *C04B 2235/785* (2013.01); *C04B 2235/786* (2013.01); *C04B 2235/80* (2013.01); *C22C 26/00* (2013.01);

*C22C 2026/006* (2013.01); *Y10T 407/27* (2015.01); *Y10T 428/265* (2015.01); *Y10T 428/31678* (2015.04)

(58) Field of Classification Search
   USPC ............ 51/307, 309; 428/336, 697, 698, 699, 428/701, 702, 704; 501/96, 96.4
   See application file for complete search history.

(56) References Cited

U.S. PATENT DOCUMENTS

| | | | | |
|---|---|---|---|---|
| 4,343,651 A * | 8/1982 | Yazu | ................... | C04B 35/5831 75/239 |
| 4,361,543 A * | 11/1982 | Zhdanovich | ........ | C04B 35/5831 423/290 |
| 5,466,642 A * | 11/1995 | Tajima | ................ | C04B 35/5831 501/87 |
| 6,008,153 A * | 12/1999 | Kukino | ................ | C04B 35/5831 501/96.1 |
| 6,331,497 B1 * | 12/2001 | Collier | ................ | C04B 35/5831 407/119 |
| 6,461,990 B1 * | 10/2002 | Masuda | ................... | B24D 3/06 501/96.3 |
| 6,635,593 B1 * | 10/2003 | Kukino | ............... | C04B 35/5831 407/119 |
| 7,758,976 B2 * | 7/2010 | Kukino | ................. | B23B 27/141 428/698 |
| 7,932,199 B2 * | 4/2011 | McHale, Jr. | .......... | B23B 27/148 51/307 |
| 8,999,531 B2 | 4/2015 | Kudoh et al. | | |
| 2003/0054940 A1 | 3/2003 | Abe et al. | | |
| 2010/0132266 A1 * | 6/2010 | Twersky | .................. | B24D 3/06 51/309 |
| 2013/0174494 A1 | 7/2013 | Twersky et al. | | |

FOREIGN PATENT DOCUMENTS

| | | | |
|---|---|---|---|
| JP | 08-109070 | * | 4/1996 |
| JP | 08-253837 | * | 10/1996 |

(Continued)

OTHER PUBLICATIONS

International Preliminary Examination Report (IPRP) dated May 13, 2014 issued in PCT counterpart application (No. PCT/JP2012/078774).

International Search Report dated Jan. 15, 2013 issued in PCT counterpart application (No. PCT/JP2012/078774).

(Continued)

*Primary Examiner* — Archene Turner
(74) *Attorney, Agent, or Firm* — Womble Carlyle

(57) ABSTRACT

A cubic boron nitride sintered body with excellent wear resistance and fracture resistance. The cubic boron nitride sintered body includes 85 to 95% by volume of cubic boron nitride, and 5 to 15% by volume of a binder phase and inevitable impurities. The binder phase has at least three compounds selected from carbides, nitrides, carbonitrides, oxides and mutual solid solutions thereof of Al, V, Cr, Mn, Co, Ni, Nb and Mo. An amount of an aluminum element contained in the cubic boron nitride sintered body is 0.5 to 5% by mass based on a total mass of the cubic boron nitride sintered body. The binder phase is essentially free of both pure metals and alloys consisting of pure metals.

12 Claims, No Drawings

(56) References Cited

FOREIGN PATENT DOCUMENTS

| JP | 2004-331456 A | 11/2004 |
| JP | 2006-315898 A | 11/2006 |
| JP | 2007-084382 | 4/2007 |
| JP | 2008-222485 A | 9/2008 |

OTHER PUBLICATIONS

Written Opinion dated Jan. 15, 2013 issued in PCT counterpart application (No. PCT/JP2012/078774) with English Translation.
Extended search report dated May 22, 2015 issued in European counterpart application (No. 12847199.2).

* cited by examiner

CUBIC BORON NITRIDE SINTERED BODY

RELATED APPLICATIONS

This is a 371 US National Phase of International Patent Application No. PCT/JP2012/078774 filed 2012 Nov. 7, and published as WO2013/069657A1 on May 16, 2013, which claims priority to JP 2011-243261, filed Nov. 7, 2011. The contents of the aforementioned applications are incorporated by reference in their entirety.

TECHNICAL FIELD

The present invention relates to a cubic boron nitride sintered body having a high cubic boron nitride content.

BACKGROUND ART

Cubic boron nitride (cBN) has high hardness next to diamond and excellent heat conductivity, and has excellent merits as a tool material where it is low affinity to iron as compared to that of the diamond. In recent years, many investigations have been made on a cubic boron nitride sintered body having a cubic boron nitride content.

As a prior art of the cubic boron nitride sintered body having a high cubic boron nitride content, it has been known a cubic boron nitride sintered body in which the cubic boron nitride sintered body is constituted by 88 to 97% by volume of cubic boron nitride, and the remainder being a binder phase comprising at least one selected from a carbide, a nitride and a boride of W, Co and Al and a solid solution thereof and inevitable impurities, wherein the binder phase contains $B_6Co_{21}W_2$, and when an X-ray diffraction intensity of the (420) plane of $B_6Co_{21}W_2$ is made Iw, and an X-ray diffraction intensity of the (111) plane of the cubic boron nitride is made Ib, then, an intensity ratio Iw/Ib which shows a ratio of Iw to Ib becomes 0.10 to 0.40 (for example, see Patent Document 1).

It has also been known a cubic boron nitride molded material comprising polycrystalline lump of cubic boron nitride grains existing an amount of at least 70% by volume, and a binder phase which is qualitatively a metal (for example, see Patent Document 2).

PRIOR ART DOCUMENTS

Patent Documents

[Patent Document 1] JP 2004-331456A
[Patent Document 2] JP 2010-512300A

SUMMARY OF THE INVENTION

Problems to be Solved by the Invention

However, the invention of the above-mentioned Patent Document 1 involves the problem that it cannot endure sufficiently to the demand of the cutting processing in recent years in the points of fracture resistance and toughness. Also, in the invention of the above-mentioned Patent Document 2, there are problems that the binder phase which is a metal easily wore, so that wear resistance is low. The present invention has been done to solve the above-mentioned problems, and an object thereof is to provide a cubic boron nitride sintered body excellent in wear resistance and fracture resistance.

Means to Solve the Problems

The present inventor has carried out researches on a cubic boron nitride sintered body, and he has obtained findings that binding of the cubic boron nitride grains becomes firm by improving the binder phase, whereby toughness of the cubic boron nitride sintered body is improved. In addition, he has also obtained findings that the binder phase of the cubic boron nitride sintered body is changed from a metal to a compound, whereby wear of the binder phase can be suppressed and wear resistance of the cubic boron nitride sintered body is improved.

The gist of the present invention is as follows.

(1) A cubic boron nitride sintered body which comprises 85 to 95% by volume of cubic boron nitride, and 5 to 15% by volume of a binder phase and inevitable impurities, wherein the binder phase comprises three or more compounds selected from the group consisting of a carbide, a nitride, a carbonitride, an oxide and a mutual solid solution thereof of an element(s) selected from the group consisting of Al, V, Cr, Mn, Co, Ni, Nb and Mo, and an amount of an aluminum element contained in the cubic boron nitride sintered body is 0.5 to 5% by mass based on a total mass of the cubic boron nitride sintered body, provided that a metal simple substance and an alloy are not contained in the binder phase.

(2) The cubic boron nitride sintered body described in (1), wherein the binder phase comprises at least one compound of AlN and $Al_2O_3$, and two or more compounds selected from the group consisting of a carbide, a nitride, a carbonitride and a mutual solid solution thereof of an element(s) selected from the group consisting of V, Cr, Mn, Co, Ni, Nb and Mo.

(3) The cubic boron nitride sintered body described in (1) or (2), wherein the binder phase comprises at least one compound of AlN and $Al_2O_3$, and two or more compounds selected from the group consisting of $Co_{5.47}N$, $Cr_2N$, CrN, $Cr_3C_2$, $Mo_2C$ and VC.

(4) The cubic boron nitride sintered body described in any one of (1) to (3), wherein the binder phase contains at least $Co_{5.47}N$ and $Cr_2N$.

(5) The cubic boron nitride sintered body described in any one of (1) to (4), wherein the binder phase comprises $Al_2O_3$, AlN, $Co_{5.47}N$ and $Cr_2N$.

(6) The cubic boron nitride sintered body described in any one of (1) to (5), wherein an amount of a tungsten element contained in the cubic boron nitride sintered body is 5% by mass or less based on the total mass of the cubic boron nitride sintered body.

(7) The cubic boron nitride sintered body described in any one of (1) to (6), wherein relating to a metal simple substance and an alloy which are not contained in the binder phase, the metal simple substance is constituted by one kind of a metal element, and the alloy is constituted by two or more kinds of metal elements.

(8) The cubic boron nitride sintered body described in any one of (1) to (7), which is used as a cutting tool or a wear resistant tool.

(9) A coated cubic boron nitride sintered body which comprises a coating film being formed on a surface of the cubic boron nitride sintered body described in any one of (1) to (7).

(10) The coated cubic boron nitride sintered body described in (9), wherein the coating comprises at least one selected from the group consisting of at least one metal selected from the group consisting of Ti, Zr, Hf, V, Nb, Ta, Cr, Mo, W, Al and Si, and an oxide, a carbide, a nitride, a boride and a mutual solid solution thereof of at least one of these metals.

(11) The coated cubic boron nitride sintered body described in (9) or (10), wherein the coating comprises at least one selected from the group consisting of TiN, TiC, TiCN, TiAlN, TiSiN and CrAlN.

(12) The coated cubic boron nitride sintered body described in any one of (9) to (11), wherein an average film thickness of the coating is 0.5 to 15 μm.

(13) The coated cubic boron nitride sintered body described in any one of (9) to (12), which is used as a cutting tool or a wear resistant tool.

Effects of the Invention

The cubic boron nitride sintered body and the coated cubic boron nitride sintered body of the present invention are excellent in wear resistance, fracture resistance and toughness. Therefore, when the cubic boron nitride sintered body and the coated cubic boron nitride sintered body of the present invention are used as a cutting tool or a wear resistant tool, an effect of elongating tool life can be obtained.

EMBODIMENTS TO CARRY OUT THE INVENTION

The cubic boron nitride sintered body of the present invention is constituted by 85 to 95% by volume of cubic boron nitride based on the total volume of the cubic boron nitride sintered body, and 5 to 15% by volume of a binder phase and inevitable impurities based on the total mass of the cubic boron nitride sintered body, and is a cubic boron nitride sintered body in which the sum thereof is 100% by volume. If the cubic boron nitride is too much exceeding 95% by volume and the binder phase and inevitable impurities are less than 5% by volume, cubic boron nitride grains are likely dropped. To the contrary, if the cubic boron nitride is less than 85% by volume and the binder phase and inevitable impurities are too much exceeding 15% by volume, wear resistance of the cubic boron nitride sintered body is lowered. By the reason, the cubic boron nitride is made 85 to 95% by volume, and the binder phase and inevitable impurities are made 5 to 15% by volume. Among these, it is preferred that the cubic boron nitride is 89 to 95% by volume, and the remainder is the binder phase and inevitable impurities. The contents (% by volume) of the cubic boron nitride, and the binder phase and inevitable impurities can be obtained by taking a photography of the cross section of the cubic boron nitride sintered body with SEM (scanning type electron microscope), and analyzing the image of the cross section photograph photographed with 1000 to 5000-fold to obtain from the respective surface area modulus.

The binder phase of the present invention comprises three or more compounds selected from the group consisting of a carbide, a nitride, a carbonitride, an oxide and mutual solid solutions thereof of an element selected from Al, V, Cr, Mn, Co, Ni, Nb and Mo. It is preferably a material comprising at least one of AlN (PDF card No. 25-1133) and $Al_2O_3$ (PDF card No. 10-0173), and two or more selected from the group consisting of a carbide, a nitride, a carbonitride and a mutual solid solution thereof of V, Cr, Mn, Co, Ni, Nb or Mo. Toughness of the cubic boron nitride sintered body could be improved by making the binder phase comprising at least one of AlN and $Al_2O_3$, and two or more selected from the group consisting of a carbide, a nitride, a carbonitride and a mutual solid solution thereof of an element selected from V, Cr, Mn, Co, Ni, Nb and Mo, since bonding of the cubic boron nitride grains becomes firm. As the carbide, the nitride, the carbonitride and a mutual solid solution thereof of V, Cr, Mn, Co, Ni, Nb and Mo, there may be mentioned CrN (PDF card No. 11-0065), $Cr_2N$ (PDF card No. 35-0803), $Cr_3C_2$ (PDF card No. 35-0804), CoN (PDF card No. 16-0116), $Co_{5.47}N$ (PDF card No. 41-0943), VC (PDF card No. 35-0786), $Mo_2C$ (PDF card No. 35-0787), etc. Here, the PDF card No. means a number to specify the substance described in Powder Diffraction File PDF-2 Release 2004 of International Centre for Diffraction Data. The binder phase of the present invention comprises these compounds, and does not contain a metal simple substance and an alloy, so that wear of the binder phase can be suppressed. In the present invention, the metal simple substance means a metal constituted by one kind of a metal element, and the alloy means a metal constituted by two or more metal elements. Incidentally, an intermetallic compound in which two or more kinds of metal elements are bonded with a certain ratio is a kind of the alloy, and the binder phase of the present invention does not contain the intermetallic compound. That is, since the whole cubic boron nitride sintered body does not contain the metal simple substance and the alloy, an effect can be obtained that wear resistance of the cubic boron nitride sintered body is improved. Among these, it is more preferred that the binder phase of the present invention comprises at least one of AlN and $Al_2O_3$, and two or more kinds selected from the group consisting of $Co_{5.47}N$, CrN, $Cr_2N$, $Cr_3C_2$, $Mo_2C$ and VC, among these, the binder phase further preferably contains $Co_{5.47}N$ and $Cr_2N$, and above all, the binder phase further more preferably comprises $Al_2O_3$, AlN, $Co_{5.47}N$ and $Cr_2N$.

The cubic boron nitride sintered body of the present invention contains 0.5 to 5% by mass of an aluminum element based on the total mass of the cubic boron nitride sintered body. The aluminum element has a function of strengthening binding of the cubic boron nitride grains and the binder phase by bonding to an oxygen adsorbed to the starting powder. If the amount of the aluminum element contained in the cubic boron nitride sintered body is less than 0.5% by mass, the function of bonding to the oxygen is insufficient so that the cubic boron nitride grains are likely dropped. To the contrary, if the amount of the aluminum element becomes large exceeding 5% by mass, aluminum nitride or aluminum boride is formed more than required whereby wear resistance of the cubic boron nitride sintered body is lowered. Therefore, the amount of the aluminum element contained in the cubic boron nitride sintered body of the present invention is made 0.5 to 5% by mass based on the total mass of the cubic boron nitride sintered body. Among these, the amount of the aluminum element is preferably 0.5 to 4% by mass based on the total mass of the cubic boron nitride sintered body. Incidentally, the amount of the aluminum element in the cubic boron nitride sintered body of the present invention can be measured by using an EDS (energy dispersive X-ray spectroscopy), etc.

An average grain size of the cubic boron nitride of the present invention is not particularly limited, but if the average grain size of the cubic boron nitride is less than 0.5 μm, an oxygen amount adsorbed on the surface of the cubic boron nitride is increased to inhibit the sintering reaction, whereby sinterability tends to be lowered, while if the average grain size becomes large exceeding 5 μm, the binder phase tends to be agglomerated, so that the thickness of the binder phase which is brittle as compared to the cubic boron nitride becomes large and fracture resistance tends to be lowered. Therefore, the average grain size of the cubic boron nitride of the present invention is preferably 0.5 to 5 μm. Among these, the average grain size of the cubic boron nitride is further preferably 1 to 3 μm.

As impurities inevitably contained in the cubic boron nitride sintered body of the present invention, there may be mentioned a lithium element migrated from the starting powder, and a tungsten element migrated at the mixing step of the starting powder. The total amount of the inevitable impurities is generally 5% by mass or less based on the total mass of the cubic boron nitride sintered body, and if it can be suppressed to 3% by mass or less, it is more preferred. Among the inevitable impurities contained in the cubic boron nitride sintered body of the present invention, the tungsten element is contained in the cubic boron nitride sintered body as a compound such as WC and WB, etc., but the tungsten element is contained with much amount, cutting properties of the cubic boron nitride sintered body tend to be lowered. Therefore, the amount of the tungsten element contained in the cubic boron nitride sintered body of the present invention is preferably 5% by mass or less based on the total mass of the cubic boron nitride sintered body since cutting properties are improved, and among these, the amount of the tungsten element is further preferably 3% by mass or less. Almost all the tungsten element contained in the cubic boron nitride sintered body of the present invention as inevitable impurities are derived from balls made of cemented carbide to be used for mixing by a ball mill. Therefore, by adjusting the composition of the balls made of the cemented carbide, the using amount of the balls made of the cemented carbide, the size of the cylinder, and the mixing time by the ball mill, the amount of the tungsten element contained in the cubic boron nitride sintered body of the present invention can be controlled. Incidentally, the amount of the tungsten element contained in the cubic boron nitride sintered body of the present invention can be measured by using an EDS (energy dispersive X-ray spectroscopy), etc.

As the coating of the present invention, there may be mentioned at least one material selected from the group consisting of at least one metal selected from Ti, Zr, Hf, V, Nb, Ta, Cr, Mo, W, Al and Si, and an oxide, a carbide, a nitride, a boride and a mutual solid solution thereof of at least one metals of the above. More specifically, there may be mentioned TiN, TiC, TiCN, TiAlN, TiSiN and CrAlN, etc. The coating may preferably be either a single layer or a laminated layer of two or more layers, and also preferably an alternately laminated layer in which thin films having different compositions and each having a thickness of 5 to 200 nm are alternately laminated. The total film thickness of the whole coating is less than 0.5 μm as an average film thickness, the effect of elongating the tool life becomes small, while it exceeds 15 μm, fracture resistance tends to be lowered. Thus, it is preferably 0.5 to 15 μm, among these, it is more preferably 1 to 10 μm, and above all, it is further preferably 1.5 to 5 μm.

The cubic boron nitride sintered body and coated cubic boron nitride sintered body of the present invention are excellent in wear resistance, fracture resistance and toughness, so that they are preferably used as a cutting tool or a wear resistant tool, among these, it is more preferably used as a cutting tool, and above all, it is further preferably used as a cutting tool for a sintered metal or a cutting tool for cast iron.

The cubic boron nitride sintered body of the present invention can be obtained, for example, by the following preparation method. As starting powders, cubic boron nitride powder having an average grain size of 0.5 to 8 μm, aluminum powder having an average grain size of 5 to 20 μm, and powder for forming the binder phase comprising two or more selected from the group consisting of a metal of V, Cr, Mn, Co, Ni, Nb and Mo, and a carbide, a nitride, a carbonitride and a mutual solid solution thereof having an average grain size of 0.5 to 5 μm are prepared. Incidentally, an average grain size of the starting powder is measured by the Fisher method (Fisher Sub-Sieve Sizer (FSSS)) described in the American Society for Testing Materials (ASTM) standard B330. The prepared starting powders are so formulated that the cubic boron nitride powder of 85 to 95% by volume, the aluminum powder of 0.5 to 8% by volume and the powder for forming the binder phase of 3 to 14.5% by volume, and the sum thereof being 100% by volume. Incidentally, the shape of the aluminum powder is not particularly limited, and in the present invention, any shape such as spherical, scaly, needle, etc., may be used. Paraffin is added to the formulated starting powders and mixed. The obtained mixture is molded, and subjected to vacuum heat treatment in vacuum at a pressure of $5 \times 10^{-3}$ Pa or less and a temperature of 700 to 1000° C. to remove organic materials such as paraffin, etc., then, placing in a ultra-high pressure and high temperature generating device and sintering under the conditions of at a pressure of 6 to 8 GPa, a temperature of 1700 to 2000° C., and a holding time of 20 to 60 minutes to obtain the objective material. Also, the cubic boron nitride sintered body of the present invention is processed to a predetermined shape by a laser cutting processing machine, etc., to manufacture a cutting tool or a wear resistant tool having the cubic boron nitride sintered body of the present invention. Further, by forming a coating on the surface of the cubic boron nitride sintered body of the present invention by the conventionally known CVD method or PVD method, the coated cubic boron nitride sintered body of the present invention can be obtained.

EXAMPLES

Example 1

Cubic boron nitride (hereinafter referred to as cBN.) powder having an average grain size of 2 μm, Cr powder having an average grain size of 4.9 μm, $Cr_2N$ powder having an average grain size of 3.0 μm, $Cr_3C_2$ powder having an average grain size of 2.7 μm, VC powder having an average grain size of 2.7 μm, $Mo_2C$ powder having an average grain size of 2.5 μm, TiN powder having an average grain size of 1.8 μm, WC powder having an average grain size of 2.2 μm, Co powder having an average grain size of 0.9 μm, and scaly aluminum (Al) powder having an average grain size of 20 μm were prepared, and formulated to a formulation composition shown in Table 1. Incidentally, the average grain sizes of the starting powders were measured by the Fisher method (Fisher Sub-Sieve Sizer (FSSS)) described in the American Society for Testing Materials (ASTM) standard B330. The formulated starting powders were placed in a cylinder for ball mill with balls made of a cemented carbide, n-hexane solvent and paraffin, and mixing by the ball mill was carried out for 24 hours. The mixed powder obtained by mixing and pulverizing by the ball mill was compression molded, and then, a deparaffinization treatment was carried out under the conditions of a pressure of $5\times10^{-3}$ Pa and a temperature of 750° C. Each of the compression molded material subjected to the deparaffinization treatment was encapsulated in a metal capsule, the metal capsule was placed in the ultra-high pressure and high temperature generating device, and the material was sintered under the conditions of a pressure of 7.0 GPa, a temperature of 1900° C., and a holding time of 30 minutes to obtain respective cubic boron nitride sintered bodies of Present products and Comparative products.

TABLE 1

| Sample No. | | Formulated composition (% by volume) |
|---|---|---|
| Present products | 1 | 90cBN—4$Cr_2N$—4Co—2Al |
| | 2 | 90cBN—4$Cr_3C_2$—4Co—2Al |
| | 3 | 90cBN—4VC—4Co—2Al |
| | 4 | 90cBN—4$Mo_2C$—4Co—2Al |
| Comparative products | 5 | 90cBN—8TiN—2Al |
| | 6 | 90cBN—4$Cr_2N$—4WC—2Al |
| | 7 | 90cBN—8$Cr_2N$—2Al |
| | 8 | 90cBN—4Cr—4Co—2Al |

The cross sections of the thus obtained cubic boron nitride sintered bodies were observed by using a SEM (SEM S-3000H manufactured by HITACHI LTD.), and the compositions thereof were analyzed by using an EDS (EMAX EX-300 manufactured by HORIBA). By image analyzing the cross section photographs taken the photographs by the SEM with 3000-fold, the content (% by volume) of the cBN and the content (% by volume) of the binder phase were obtained from the respective surface areas. Also, an amount (% by mass) of the aluminum (Al) element and an amount (% by mass) of the tungsten (W) element contained in the whole cubic boron nitride sintered body were quantitatively analyzed by the EDS. Next, by using X-ray diffraction device RINT-TTRIII manufactured by Rigaku Corporation, X-ray diffraction measurement of the cubic boron nitride sintered bodies were carried out under the measurement conditions wherein an output: 50 kV, 250 mA, Cu-Kα, a solar slit on the incidence side: 5°, a vertical divergence slit: ½°, a vertical divergence limitation slit: 10 mm, a scattering slit ⅔°, a solar slit on the light receiving side: 5°, a light receiving slit: 0.15 mm, BENT monochromator, a light receiving monochromatic slit: 0.8 mm, sampling width: 0.02°, scanning speed: 0.1°/min, 2θ/θ method, and 2θ measurement range: 30 to 80°, each phase ($Al_2O_3$ (PDF card No. 10-0173), AlN (PDF card No. 25-1133), cBN (PDF card No. 35-1365), Co (PDF card No. 15-0806), $Co_{5.47}N$ (PDF card No. 41-0943), Cr (PDF card No. 06-0694), CrN(PDF card No. 11-0065), $Cr_2N$ (PDF card No. 35-0803), $Cr_3C_2$ (PDF card No. 35-0804), $Mo_2C$ (PDF card No. 35-0787), TiN (PDF card No. 38-1420), VC (PDF card No. 35-0786), WC (PDF card No. 51-0939), WB (PDF card No. 06-0541), etc.) of the cubic boron nitride sintered bodies were identified. These results are shown in Table 2.

TABLE 2

| | | Cubic boron nitride sintered body | | | Amounts of elements contained in whole cubic boron nitride sintered body | |
|---|---|---|---|---|---|---|
| | | cBN | Binder phase | | | |
| Sample No. | | % by volume | Composition (identified by X-ray diffraction) | % by volume | Al (% by mass) | W (% by mass) |
| Present products | 1 | 89.5 | $Cr_2N$, $Co_{5.47}N$, $Al_2O_3$ | 10.5 | 1.6 | 0.6 |
| | 2 | 89.8 | $Cr_3C_2$, $Co_{5.47}N$, $Al_2O_3$ | 10.2 | 1.6 | 0.9 |
| | 3 | 89.7 | VC, $Co_{5.47}N$, $Al_2O_3$ | 10.3 | 1.7 | 0.6 |
| | 4 | 90.0 | $Mo_2C$, $Co_{5.47}N$, $Al_2O_3$ | 10.0 | 1.3 | 0.8 |
| Comparative products | 5 | 90.0 | TiN, $Al_2O_3$ | 10.0 | 1.4 | 0.6 |
| | 6 | 89.3 | $Cr_2N$, WC, WB, $Al_2O_3$ | 10.7 | 1.3 | 8.8 |
| | 7 | 89.6 | $Cr_2N$, $Al_2O_3$ | 10.4 | 1.5 | 0.9 |
| | 8 | 89.6 | Cr, CrN, Co, $Co_{5.47}N$, $Al_2O_3$ | 10.4 | 1.2 | 0.7 |

With regard to Present products and Comparative products, the cubic boron nitride sintered bodies were cut to a predetermined shape by a laser cutting processing machine, brazed to a cemented carbide substrate, and subjected to finish-grinding to obtain each cutting tool having a cutting insert shape of ISO standard CNGA120408. By using these cutting inserts, the following mentioned Cutting Tests (1) and (2) were carried out. These results are shown in Table 3.

Cutting Test (1)
Outer peripheral continuous wet cutting (turning),
Work piece material: Sintered metal subjected to carburizing and quenching (Chemical component C, 0.2 to 1.0% by mass, Fe: the remainder, others: 1% by mass or less (corresponding to old JIS standard SMF4040), HRA63 to 65),
Shape of work piece material: Cylindrical φ45 mm×85 mm,
Cutting speed: 250 m/min,
Amount of depth of cut: 0.2 mm,
Feed rate: 0.1 mm/rev,
Insert shape: CNGA120408,
Holder: DCLNR2525M12,
Evaluation: Cutting time until the corner wear amount VBc reaches to 0.15 mm or cutting time causing fracture.

Cutting Test (2)
Outer peripheral interrupted wet cutting (turning),
Work piece material: Sintered metal (Chemical components C: 0.2 to 1.0% by mass, Fe: remainder, others: 1% by mass or less (corresponding to old JIS standard SMF4040), HRB77 to 80), Shape of work piece material: Shape of gear φ45 mm (depth 8 mm)×30 mm,
Cutting speed: 300 m/min,
Amount of depth of cut: 0.2 mm,
Feed rate: 0.1 mm/rev,
Insert shape: CNGA120408,
Holder: DCLNR2525M12,
Evaluation: Cutting time until the corner wear amount VBc reaches to 0.15 mm or cutting time causing fracture.

TABLE 3

| Sample No. | | Cutting Test (1) | | Cutting Test (2) | |
|---|---|---|---|---|---|
| | | Tool life/min | Reason of tool life | Tool life/min | Reason of tool life |
| Present products | 1 | 38 | Normal wear | 58 | Normal wear |
| | 2 | 30 | Normal wear | 52 | Normal wear |
| | 3 | 35 | Normal wear | 49 | Normal wear |
| | 4 | 28 | Normal wear | 47 | Normal wear |
| Comparative products | 5 | 0.5 | Fracture | 3 | Fracture |
| | 6 | 1 | Fracture | 22 | Fracture |
| | 7 | 4 | Fracture | 35 | Normal wear |
| | 8 | 7 | Normal wear | 18 | Normal wear |

As shown in Table 3, the cubic boron nitride sintered bodies of the present invention are excellent in wear resistance and fracture resistance, so that it can be understood that they have long tool life than those of the comparative cubic boron nitride sintered bodies.

Example 2

The starting powders used in Example 1 were formulated to the formulation compositions shown in Table 4, and cubic boron nitride sintered bodies were prepared by the same preparation method as in Example 1.

TABLE 4

| Sample No. | | Formulated composition (% by volume) |
|---|---|---|
| Present products | 9 | 90cBN—2.5$Cr_2N$—2.5Co—5Al |
| | 10 | 90cBN—4.5$Cr_2N$—4.5Co—1Al |
| Comparative products | 11 | 90cBN—1.5$Cr_2N$—1.5Co—7Al |
| | 12 | 90cBN—5$Cr_2N$—5Co |

With regard to the obtained cubic boron nitride sintered bodes, various kinds of measurements were carried out in the same measurement methods as in Example 1. These results are shown in Table 5.

TABLE 5

| Sample No. | | Cubic boron nitride sintered body | | | Amounts of elements contained in whole cubic boron nitride sintered body | |
|---|---|---|---|---|---|---|
| | | cBN | Binder phase | | | |
| | | % by volume | Composition (identified by X-ray diffraction) | % by volume | Al (% by mass) | W (% by mass) |
| Present products | 9 | 89.8 | $Cr_2N$, $Co_{5.47}N$, $Al_2O_3$ | 10.2 | 3.5 | 0.8 |
| | 10 | 89.8 | $Cr_2N$, $Co_{5.47}N$, $Al_2O_3$ | 10.2 | 0.5 | 0.6 |
| Comparative products | 11 | 88.9 | $Cr_2N$, $Co_{5.47}N$, $Al_2O_3$, AlN | 11.1 | 5.5 | 0.6 |
| | 12 | 90.1 | $Cr_2N$, Co, $Co_{5.47}N$ | 9.9 | 0 | 0.9 |

With regard to Present products and Comparative products, the cubic boron nitride sintered bodies were processed in the same manner as in Example 1 to obtain each cutting tool having a cutting insert shape of ISO standard CNGA120408. By using these cutting inserts, the Cutting Tests (1) and (2) were carried out under the same testing conditions as in Example 1. These results are shown in Table 6.

TABLE 6

| Sample No. | | Cutting Test (1) | | Cutting Test (2) | |
|---|---|---|---|---|---|
| | | Tool life/min | Reason of tool life | Tool life/min | Reason of tool life |
| Present products | 9 | 28 | Normal wear | 43 | Normal wear |
| | 10 | 29 | Normal wear | 49 | Normal wear |
| Comparative products | 11 | 12 | Normal wear | 28 | Normal wear |
| | 12 | 0.5 | Fracture | 38 | Normal wear |

As shown in Table 6, the cubic boron nitride sintered bodies of the present invention are excellent in wear resistance and fracture resistance, so that it can be understood that they have long tool life than those of the comparative cubic boron nitride sintered bodies.

Example 3

The starting powders used in Example 1 were formulated to the formulation compositions shown in Table 7, and cubic boron nitride sintered bodies were prepared by the same preparation method as in Example 1.

TABLE 7

| Sample No. | | Formulated composition (% by volume) |
|---|---|---|
| Present products | 13 | 95cBN—2$Cr_2N$—2Co—1Al |
| | 14 | 85cBN—6.5$Cr_2N$—6.5Co—2Al |
| Comparative products | 15 | 97cBN—1$Cr_2N$—1Co—1Al |
| | 16 | 80cBN—8.5$Cr_2N$—8.5Co—3Al |

With regard to the obtained cubic boron nitride sintered bodes, various kinds of measurements were carried out in the same measurement methods as in Example 1. These results are shown in Table 8.

TABLE 8

| Sample No. | | Cubic boron nitride sintered body | | | Amounts of elements contained in whole cubic boron nitride sintered body | |
|---|---|---|---|---|---|---|
| | | cBN | Binder phase | | | |
| | | % by volume | Composition (identified by X-ray diffraction) | % by volume | Al (% by mass) | W (% by mass) |
| Present products | 13 | 94.1 | $Cr_2N$, $Co_{5.47}N$, $Al_2O_3$ | 5.9 | 0.7 | 1.0 |
| | 14 | 85.0 | $Cr_2N$, $Co_{5.47}N$, $Al_2O_3$ | 15.0 | 1.4 | 0.5 |
| Comparative products | 15 | 96.0 | $Cr_2N$, $Co_{5.47}N$, $Al_2O_3$ | 4.0 | 0.6 | 0.8 |
| | 16 | 80.0 | $Cr_2N$, Co, $Co_{5.47}N$, $Al_2O_3$ | 20.0 | 1.9 | 0.6 |

With regard to Present products and Comparative products, the cubic boron nitride sintered bodies were processed in the same manner as in Example 1 to obtain each cutting tool having a cutting insert shape of ISO standard CNGA120408. By using these cutting inserts, the Cutting Tests (1) and (2) were carried out under the same testing conditions as in Example 1. These results are shown in Table 9.

TABLE 9

| | | Cutting Test (1) | | Cutting Test (2) | |
|---|---|---|---|---|---|
| Sample No. | | Tool life/min | Reason of tool life | Tool life/min | Reason of tool life |
| Present products | 13 | 37 | Normal wear | 52 | Normal wear |
| | 14 | 25 | Normal wear | 42 | Normal wear |
| Comparative products | 15 | 1 | Fracture | 39 | Fracture |
| | 16 | 18 | Normal wear | 28 | Normal wear |

As shown in Table 9, the cubic boron nitride sintered bodies of the present invention are excellent in wear resistance and fracture resistance, so that it can be understood that they have long tool life than those of the comparative cubic boron nitride sintered bodies.

Example 4

Coating treatment was carried out on the surface of Present product 1 of Example 1 by using a PVD device. The material in which a TiN film having an average film thickness of 3 μm had been formed on the surface of Present product 1 was made Present product 17, and the material in which a TiAlN film having an average film thickness of 3 μm had been formed on the surface of Present product 1 was made Present product 18. The same Cutting Tests (1) and (2) as in Example 1 were carried out with regard to Present products 17 and 18. These results are shown in Table 10.

TABLE 10

| | | Cutting Test (1) | | Cutting Test (2) | |
|---|---|---|---|---|---|
| Sample No. | | Tool life/min | Reason of tool life | Tool life/min | Reason of tool life |
| Present products | 17 | 42 | Normal wear | 62 | Normal wear |
| | 18 | 42 | Normal wear | 64 | Normal wear |
| | 1 | 38 | Normal wear | 58 | Normal wear |

Present products 17 and 18 in which the coatings had been formed could be elongated their tool lives than that of Present product 1 in which no coating had been formed.

UTILIZABILITY IN INDUSTRY

According to the present invention, cubic boron nitride sintered bodies and coated cubic boron nitride sintered bodies excellent in wear resistance, fracture resistance and toughness can be provided. When the cubic boron nitride sintered bodies and coated cubic boron nitride sintered bodies of the present invention are used as a cutting tool or a wear resistant tool, an effect of elongating the tool life can be obtained.

The invention claimed is:

1. A cubic boron nitride sintered body which comprises 85 to 95% by volume of cubic boron nitride, and 5 to 15% by volume of a binder phase and inevitable impurities, wherein
   the binder phase comprises three or more compounds selected from the group consisting of a carbide, a nitride, a carbonitride, an oxide and a mutual solid solution thereof of an element(s) selected from the group consisting of Al, V, Cr, Mn, Co, Ni, Nb and Mo,
   an amount of an aluminum element contained in the cubic boron nitride sintered body is 0.5 to 5% by mass based on a total mass of the cubic boron nitride sintered body, and
   the binder phase is essentially free of both pure metals and alloys consisting of pure metals.

2. The cubic boron nitride sintered body according to claim 1, wherein the binder phase comprises at least one compound of AlN and $Al_2O_3$, and two or more compounds selected from the group consisting of a carbide, a nitride, a carbonitride and a mutual solid solution thereof of an element(s) selected from the group consisting of V, Cr, Mn, Co, Ni, Nb and Mo.

3. The cubic boron nitride sintered body according to claim 1, wherein the binder phase comprises at least one compound of AlN and $Al_2O_3$, and two or more compounds selected from the group consisting of $Co_{5.47}N$, $Cr_2N$, CrN, $Cr_3C_2$, $Mo_2C$ and VC.

4. The cubic boron nitride sintered body according to claim 1, wherein the binder phase contains at least $Co_{5.47}N$ and $Cr_2N$.

5. The cubic boron nitride sintered body according to claim 1, wherein the binder phase comprises $Al_2O_3$, AlN, $Co_{5.47}N$ and $Cr_2N$.

6. The cubic boron nitride sintered body according to claim 1, wherein an amount of a tungsten element contained in the cubic boron nitride sintered body is 5% by mass or less based on the total mass of the cubic boron nitride sintered body.

7. A cutting tool comprising the cubic boron nitride sintered body according to claim 1.

8. The cubic boron nitride sintered body according to claim 1, further comprising coating film formed on a surface of the cubic boron nitride sintered body.

9. The coated cubic boron nitride sintered body according to claim 8, wherein the coating comprises at least one selected from the group consisting of at least one metal selected from the group consisting of Ti, Zr, Hf, V, Nb, Ta, Cr, Mo, W, Al and Si, and an oxide, a carbide, a nitride, a boride and a mutual solid solution thereof of at least one of these metals.

10. The coated cubic boron nitride sintered body according to claim 8, wherein the coating comprises at least one compound selected from the group consisting of TiN, TiC, TiCN, TiAlN, TiSiN and CrAlN.

11. The coated cubic boron nitride sintered body according to claim 8, wherein an average film thickness of the coating is 0.5 to 15 μm.

12. A cutting tool comprising the coated cubic boron nitride sintered body according to claim 8.

* * * * *